COATING OR PLASTIC.

Patented June 14, 1938

2,120,468

UNITED STATES PATENT OFFICE 2,120,468

EXPANDED CONCRETE AND PROCESS OF PRODUCING THE SAME

Noak Victor Hybinette, Jackson, Mich.

No Drawing. Application March 28, 1935, Serial No. 13,492. Renewed November 10, 1937

12 Claims. (Cl. 106—24)

This invention relates to improvements in the art of expanding concrete by the action of hydrogen gas evolved from reaction between metallic flakes of practically pure aluminum and lime in a concrete mixture.

Aluminum flakes used for this purpose are often made from commercially pure aluminum by rolling to a thin foil, cutting the foil into small pieces and reducing such material to a fine powder of extremely thin flakes in so-called hammer mills where the metal is hammered until the flakes break into smaller pieces of a thickness which is considerably less than one-thousandth part of an inch. In this hammering process the flakes would weld together were it not that an addition of some suitable material is made to prevent such welding action. Only one material has been found to be suitable for this purpose; stearin or stearic acid is universally used.

Similar flakes are used for producing aluminum paint, as well as for the purpose of expanding concrete. The only difference between the two uses is that in the case of expanding concrete, more than small amounts of stearin retard the reaction between the aluminum and the lime in the cement to an excessive degree. The flakes produced for that particular purpose are therefore reduced in the hammering mills with the smallest possible addition of stearin, say three to five percent, whereas the stearin present in the flakes used for paint may be as high as ten percent or more of the weight of the finished flakes. It has also been previously found that the expanding of concrete is best made with hot water, but this use of hot water in the concrete mixture has only been considered to be advantageous for the reason that the lime is dissolved out of the cement quicker and the reaction is produced quicker, like most chemical reactions, at an elevated temperature.

The amount of expansion attained is of course always equal to the volume of hydrogen gas evolved less the amount of gas which escapes to the atmosphere. By a simple calculation it is evident that one gram of aluminum should produce approximately 1,200 cubic centimeters of hydrogen gas at normal pressure and temperature. The expansion obtained by the use of the heretofore known stearin coated aluminum flakes is not quite one-half of this amount. In my co-pending patent application, Serial No. 10,092, filed on March 8, 1935, of which the present application is a continuation in part, I have disclosed my discovery that an addition of oil or any greasy material that retards the setting of concrete produces an increased effect of the flakes equal to thirty or forty percent of the expansion ordinarily obtained.

The object of this present patent application is to disclose an improved process whereby very nearly 100% of the theoretical expansion capacity of the aluminum flakes is obtained.

My process consists simply in that the flakes are treated with a certain amount of oil capable of dissolving the stearin and subjecting the mixture of oil and aluminum flakes to a rubbing or mixing action so as to make sure that the stearin is removed from the surface of the flakes. This mixture of oil and flakes is preferably ground together with a small amount of cement so as to produce a dry powder of oil, cement and flakes, the stearin being dissolved in the oil and removed from the flakes. It is evident that the stearin will ultimately combine with lime and make a stearate of lime which may or may not be soluble in the oil I am using.

In carrying out my process I use sufficient oil to produce a retarding action in the setting of the concrete so that the concrete will not begin to set for three or four hours after the mixture is made, which allows sufficient time for the complete hydrogen producing reaction between the lime and aluminum. The oil has a further function in that it increases the consistency of the mixture so that the hydrogen is retained within the concrete, rather than bubbling its way to the atmosphere. In this way I obtain practically 100% expansion independent of the temperature of the water that is used.

According to this invention some oils are better than others. I have found that a distillate oil having a specific gravity of the order of 24° to 30° Baumé at 60° F., such as is generally used for oil burners is the best and also the cheapest for my purposes. It cleans the aluminum, it retards the setting of the concrete, and gives the best consistency to the concrete mixture so that a maximum expansion is obtained. Other oils than those above named may be used, although their ability to clean the aluminum, retard the setting or increase the consistency in the concrete mixture varies over wide ranges.

In ordinary practice I produce a powder consisting of one pound of aluminum flakes, one pound of ordinary fuel oil and eight pounds of cement by first mixing the aluminum flakes and the oil, and then subjecting the mixture to a rubbing or mixing action for a sufficient length of time to dissolve or remove the stearin from the surface of the aluminum. The cement is then added and the mixture is worked or ground until an even mixture of the consistency of a fairly dry powder is obtained, the amount of cement added being sufficient to absorb the amount of oil used. This product may then be sold as such for use in the field to be added to additional amounts of cement, or a mixture may be made from aluminum flakes and oil and used in the concrete mixture from time to time as needed.

I have washed heretofore known aluminum flakes free from stearin with acetone and find that anything like complete solution of the aluminum in the lime is impossible without an addition of oil to retard the setting of the concrete.

From the foregoing description it will be apparent that according to this invention I am able to obtain practically 100% of the theoretical expansion of concrete possible from a predetermined amount of aluminum. In other words, more than twice as great an expansion as has been heretofore possible with a predetermined amount of aluminum. The result is that for a given amount of concrete, a given amount of expansion may be provided with much less aluminum, and consequently at a much lower cost than heretofore has been possible. Furthermore, the fact that this expansion may be obtained at any time without the use of hot water makes possible the expanding of concrete mixtures during winter months when lowered temperatures made the mixing with hot water practically an impossibility.

Having thus described my invention, what I desire to secure by Letters Patent and claim is:

1. An expanded concrete made from a concrete mixture having added thereto aluminum flakes, including a quantity of a flake separating substance added during the formation of the flakes, and a solvent for said substance, said solvent being characterized by its ability to retard the setting of the concrete.

2. An expanded concrete made from a concrete mixture having added thereto commercial aluminum flakes including a quantity of stearin, and solvent for the stearin, said solvent being characterized by its ability to retard the setting of concrete.

3. An expanded concrete made from a concrete mixture having added thereto aluminum flakes, and unsaponifiable oil.

4. As a composition, a powder for use in expanding concrete, comprising a mixture of aluminum flakes, unsaponifiable oil and cement.

5. As a composition, a powder for use in expanding concrete comprising a mixture of aluminum flakes and unsaponifiable oil.

6. The process of expanding concrete with aluminum flakes, the aluminum flakes being characterized by the fact that they include a quantity of stearin, comprising mixing such flakes with a petroleum base oil, said oil acting to remove the stearin from the surface of said aluminum flakes, and adding said mixture of aluminum flakes and oil to the concrete mixture, the oil acting as a retarder to the setting of the concrete for the purpose herein described.

7. An expanded concrete made from a concrete mixture having added thereto finely divided particles of aluminum, a greasy substance associated with the aluminum, and a solvent for the greasy substance, said solvent being characterized by its ability to retard the setting of the concrete.

8. A process of expanding concrete with finely divided particles of aluminum, the aluminum being characterized by the fact that its surface is coated with a quantity of greasy substances comprising mixing the aluminum with a petroleum base oil, said oil acting to remove the greasy substance from the surface of said aluminum and adding said mixture of aluminum and oil to the concrete mixture, the oil acting as a retarder to the setting of the concrete for the purpose herein described.

9. As a step in the process of making expanded concrete, the treatment of finely divided particles of aluminum with an unsaponifiable oil to remove greasy substances from the surface thereof to enhance the chemical reaction between the aluminum and the concrete mixture.

10. A merchantable product to be added in concrete mixtures for the purpose of expanding the same consisting of commercial aluminum flakes coated with stearin during the process of manufacture, a petroleum base oil and a dry powder in such proportions that the oil is capable of dissolving the stearin on the aluminum flakes and the dry powder is able to absorb the oil and stearin so that the whole mixture constitutes a substantially dry powder.

11. An expanded concrete made from a concrete mixture having added thereto aluminum flakes, including a quantity of a flake separating substance added during the formation of the flakes, and an unsaponifiable solvent for said substance, said solvent being characterized by its ability to retard the setting of the concrete.

12. An expanded concrete made from a concrete mixture having added thereto finely divided particles of aluminum, a greasy substance associated with the aluminum, and an unsaponifiable solvent for the greasy substance, said solvent being characterized by its ability to retard the setting of the concrete.

NOAK VICTOR HYBINETTE.